US010773638B2

(12) United States Patent
Doerne et al.

(10) Patent No.: US 10,773,638 B2
(45) Date of Patent: Sep. 15, 2020

(54) METHOD FOR OPERATING A HEADLIGHT OF A VEHICLE, AND HIGH BEAM ASSIST SYSTEM

(71) Applicant: Ford Global Technologies, LLC, Dearborn, MI (US)

(72) Inventors: Gerald Doerne, Cologne (DE); Gregor Allexi, Troisdorf (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/559,361

(22) Filed: Sep. 3, 2019

(65) Prior Publication Data

US 2020/0086782 A1   Mar. 19, 2020

(30) Foreign Application Priority Data

Sep. 14, 2018  (DE) .................. 10 2018 215 666

(51) Int. Cl.
*B60Q 1/14* (2006.01)
*B60Q 1/02* (2006.01)
*B60W 40/076* (2012.01)
*B60W 40/072* (2012.01)
*B60Q 1/08* (2006.01)

(52) U.S. Cl.
CPC ............. *B60Q 1/143* (2013.01); *B60Q 1/085* (2013.01); *B60W 40/072* (2013.01); *B60W 40/076* (2013.01)

(58) Field of Classification Search
CPC ........ B60Q 1/44; B60Q 1/143; B60Q 1/1423; B60Q 9/001; B60Q 2300/112; B60Q 1/122; B60Q 2300/122; B60Q 1/124; B60Q 1/1415; B60Q 1/18; B60Q 1/54; B60Q 2300/314; B60Q 2300/42; F21V 23/02; F21V 25/12; H05B 37/0236; A63J 17/00; F21L 14/026
See application file for complete search history.

(56) References Cited

U.S. PATENT DOCUMENTS

2016/0238210 A1* 8/2016 Masuda ............... F21S 41/143
2018/0118095 A1* 5/2018 Kunii ................. G01C 21/3626

* cited by examiner

*Primary Examiner* — Minh D A
(74) *Attorney, Agent, or Firm* — Frank Lollo; Eversheds Sutherland (US) LLP (57) ABSTRACT

The invention relates to a method for operating a headlight of a vehicle in which the, in particular activated, high beam function is controlled on the basis of surroundings information.
To reduce the reaction time for controlling the high beam function, it is proposed that at least one critical zone (3) of a roadway section (1) in the surroundings ahead is identified in which the appearance of surrounding traffic which is not yet in the field of vision is likely. The identified critical zone (3) is subsequently monitored for at least one indicator for surrounding traffic potentially soon coming into the field of vision, wherein the high beam function is controlled in an appropriate manner upon the appearance of this indicator.

11 Claims, 9 Drawing Sheets

METHOD FOR OPERATING A HEADLIGHT OF A VEHICLE, AND HIGH BEAM ASSIST SYSTEM

CROSS-REFERENCE TO RELATED APPLICATIONS

This application claims priority to and the benefit of German patent application No. 102018215666.2, filed Sep. 14, 2018, which is hereby incorporated by reference herein in its entirety.

The invention relates to a method for operating a headlight of a vehicle according to the features in the precharacterizing clause of claim 1, in which the, in particular activated, high beam function is controlled on the basis of surroundings information. The invention furthermore relates to a high beam assist system for carrying out the method having the features of claim 10.

In particular, manned vehicles require adequate illumination of the road section in front of them. In addition to the usual dimmed beam, the high beam in this case fulfills an important task to ensure as far-reaching illumination as possible.

From U.S. Pat. No. 9,649,974 B1, a headlight control device and a method for the automatic monitoring of a vehicle headlight are known, which enable the respective light output and distribution to be adapted as optimally as possible. On the basis of information, for instance information relating to speed, the road, surroundings or weather, an optimum light intensity distribution for this is firstly determined from a database and compared to the actual light intensity distribution. In the event of deviations, the vehicle headlights are controlled accordingly, for instance by altering the light intensity, to switching between dimmed beam and high beam to switching the fog lights on and off.

U.S. Pat. No. 9,651,390 B1 discloses a method and a device for mapping the illumination of roadways. To this end, high beam data and information relating to the associated roadway conditions are transmitted to a server, and a frequency of the use of high beam is determined on the basis of this. The information relating to the illumination of the respective roadway which can be calculated from this is used for expanding a geographical database containing illumination information. In combination with further assist systems, for instance GPS, radar, camera and lidar (light detection and ranging) or ladar (laser detection and ranging), such a geographical database provides further support for vehicles, in particular in their automated mode.

The inappropriate use of high beam can be extremely unpleasant or even dangerous for other road users owing to its dazzling effect. Although previously known high beam assist systems monitor the zone in the illumination cone of the vehicle and, upon detecting oncoming traffic, dim the headlights by controlling the high beam function accordingly, it is still not possible to rule out at least temporary dazzling here. In light of these observations, the previously known systems therefore definitely still offer room for improvement.

Against this background, the object of the present invention consists in further developing a method for operating a headlight of a vehicle in such a way that the reaction time for controlling the high beam function is shortened. Furthermore, an assist system provided for carrying out the method should be introduced.

The method part of this object is achieved according to the invention in a method having the features of claim 1. Advantageous further developments are the content of the dependent claims 2 to 9. The device part of this object is achieved by a high beam assist system having the features of claim 10.

According to this, the method according to the invention comprises measures according to which at least a critical zone of a roadway section in the vehicle surroundings ahead is identified in which the appearance of surrounding traffic which is not yet in the field of vision is likely. In other words, in this case, a section of the roadway which lies ahead and, in this regard, is travelled by the vehicle is preferably continuously analyzed in terms of whether it contains zones which are not currently visible and in which the sudden appearance of surrounding traffic, in particular oncoming traffic, is to be expected. The zone(s) is/are then declared to be critical zones and is/are subject to observation in that the zone classed as critical is monitored for at least one indicator for surrounding traffic potentially soon coming into the field of vision. As soon as an indicator for the potential appearance of surrounding traffic within the monitored critical zone appears, the high beam function is controlled accordingly.

The advantage of this consists in the possibility of a reaction time which is thus considerably reduced with regard to the control of the high beam function. Compared to previously known methods and corresponding systems in which the control of the high beam function is only implemented upon the appearance of surrounding traffic in the field of vision (for example in the detection zone of a corresponding sensor), the method according to the invention comprises an anticipatory procedure.

Within the context of the invention, control of the high beam function is understood to mean not only the concrete manipulation of a light source but also the preparation preceding the respective manipulation. In this regard, the said preparation can consist, for example, in specifying a control of the high beam function which is already matched to the expected surrounding traffic upon the appearance of a corresponding indicator.

As soon as the predicted surrounding traffic is then actually detected in the field of vision, immediate implementation of the previously specified control of the high beam function can take place without further delay.

The detection of the surrounding traffic in the field of vision can be based, for example, on the recognition of its accompanying light source. The possibility of recognizing surrounding traffic in general, for instance by detecting objects and identifying them as vehicles, is also conceivable.

According to a particularly preferred further development of the essential inventive idea, the roadway section ahead can be analyzed by means of a sensor and/or GPS in combination with stored cartographic material. According to this, for example, the cartographic material providing an accompanying navigation system can be used to obtain information relating to the actual path of the roadway section ahead. The current location of the vehicle within the respective zone of the cartographic material can be determined by means of GPS (global positioning system). The direction of the vehicle relative to the cartographic material can be retrieved for example on the basis of the movement of the vehicle and/or an accompanying arrangement for directional reference, for instance a compass. In particular, changes in direction within the roadway section ahead can therefore already be retrieved from the cartographic material itself, which changes in direction possibly represent a critical zone for surrounding traffic which is not initially visible and may therefore appear suddenly. Any details contained in the cartographic material which relate to the topography of the roadway section ahead can likewise contain reference to possibly critical zones in which the field of vision is subject to corresponding restrictions. Via an accompanying sensor, surroundings information relating to the path of the respective roadway section ahead can also be determined without the use of cartographic material. Of course, the sensor can also be used to supplement and/or to verify the information already present via the cartographic material. In a particularly advantageous manner, the sensor can serve to analyze the actual conditions to be found along the roadway section ahead in order to derive potential critical zones from this. A conceivable scenario for this is, for example, a roadway path having a slight bend, which, according to the cartographic material, should be classed as an easily visible section, but whereof the actual visibility is impaired, for example, by buildings and/or vegetation and/or temporarily parked vehicles. By means of the sensor, it is also possible here to identify potentially critical zones which would otherwise not be identifiable on the basis of the cartographic material alone.

In general, the method according to the invention is preferably implemented such that at least one of the zones, listed below, along the identified road section ahead is identified as a potentially critical zone:
  brow of a hill;
  intersection;
  bend;
  traffic circle.

In this regard, for example, the further path of a roadway section which follows a brow of a hill is naturally classed as non-visible, which means that previously known methods and systems only recognize surrounding traffic located on this roadway section, in particular oncoming traffic, when it appears in the field of vision. The same applies to paths of a roadway section around bends, which are barely visible, if at all. In particular, an intersection which has a structural development alongside it and/or a traffic circle are typically not visible since the presence of the structural development obscures vision and/or the design of the island zone delimited by a traffic circle is disruptive to vision, for example due to an elevation, a structural development and/or vegetation.

As soon as a zone of the roadway section ahead is identified as a critical zone, a subsequently commencing investigation thereof takes place. The said investigation can preferably end as soon as the critical zone has been reached and/or passed. Such an investigation, within the context of the invention, means that the identified critical zone is subject to observation during which any indicators for surrounding traffic possibly soon entering the field of vision are identified. In an advantageous manner, the respective critical zone is examined for at least one of the indicators listed below:
  an increase in surrounding brightness;
  a rise in the number of reflections.

Typically, zones and/or objects captured by the light system of surrounding traffic which is otherwise not (yet) in the field of vision throw back corresponding reflections which can be assessed as indicators for the presence of surrounding traffic which is not currently concretely visible. These can be, for example, light reflections or merely general changes in the brightness, such as are produced, for example, when shrubs, bushes and/or trees are illuminated from a non-visible side. Overall, in spite of directed headlights, local illumination mostly leads to an increase in the surrounding brightness, which can be attributed, for example, to particles (water droplets, dust) contained in the air and reflections as described above. All these indicators can be used in an advantageous manner to predict the potential appearance of surrounding traffic which was not previously directly recognizable.

With regard to the reaction to the appearance of an indicator within the monitored critical zone for surrounding traffic potentially soon coming into the field of vision, this depends, amongst other things, on the design of the respective light system or headlight. The high beam function can then preferably be controlled in at least one of the ways listed below:
  enhancing the sensitivity of an optical sensor in the critical zone;
  deactivating the active high beam;
  altering the intensity of the active high beam;
  masking a high beam cone in a zone in which the predicted surrounding traffic is expected.

As can be recognized, the appearance of at least one indicator for surrounding traffic possibly soon arriving in the field of vision can firstly be used to enhance the sensitivity of an optical sensor in the zone previously classed as critical. Further information can thus be collected to corroborate the prediction of the appearance of surrounding traffic. Of course, the enhanced sensitivity of the said sensor can also serve to reduce the reaction time upon the actual appearance of the surrounding traffic in the field of vision in the sense of an "armed mode". The function of a conventional high beam assist system can therefore be supplemented by an at least virtually dazzle-free high beam function. In this case, the deactivation of the previously still active high beam which takes place upon the appearance of an indicator corresponds substantially to a conventional high beam assist system, although its reaction takes place notably earlier and does not firstly require the actual appearance—generally associated with a corresponding dazzling effect—of the surrounding traffic. If the headlight is equipped accordingly, masking of the high beam cone emerging from it takes place in at least one zone in which the predicted surrounding traffic is expected. In this case "masking" means that its light source is covered zonally to prevent a possible dazzling effect on the surrounding traffic despite an active high beam. In this regard, this corresponds to an actually dazzle-free high beam which, compared to previously known methods and systems, includes the prompt implementation of covering measures.

With further regard to the reaction to the appearance of an indicator within the monitored critical zone for surrounding traffic potentially soon coming into the field of vision, the said indicator can be used to enhance the sensitivity of the optical sensor in the critical zone when a previously defined limit value for the increase in the surrounding brightness is exceeded. According to this, the increase in the surrounding brightness must exceed a predetermined amount to initiate the enhancement of the sensor sensitivity.

In each case, the invention provides that, in conjunction with at least one of the measures demonstrated above, the high beam function can be controlled immediately without carrying out a plausibility check as soon as a direct light source is detected within the monitored critical zone. In particular, the omission of an additionally possible plausibility check enables very rapid reaction times when controlling the high beam function. This is possible due to the predictive properties of the method according to the invention which serve as a relatively reliable indicator for the appearance of surrounding traffic which is not yet in the field of vision, which enables the omission of a plausibility check. Without such a plausibility check, the control of the high beam function in conventional methods and systems would be skittish since, for example, all reflections from its own light source (for instance caused by road signs and other surfaces) and other extraneous light would have to be assessed as a sign of surrounding traffic.

As soon as the initially predicted appearance of surrounding traffic is confirmed, in that this is actually detected within the monitored critical zone, the high beam function can be controlled in at least one of the ways listed below:

deactivating the active high beam;
altering the intensity of the active high beam;
masking a high beam cone in a zone in which the predicted surrounding traffic appears.

The above-mentioned possible measures correspond to the measures already addressed previously, so reference is made to the detailed embodiments to avoid repetition. In contrast to the context within which said measures have already been addressed, in this case they can be implemented upon the actual appearance of surrounding traffic, whereas, above, they can already take place upon the appearance of an indicator for surrounding traffic possibly soon appearing in the field of vision.

With reference to the possibility of masking a high beam cone in a zone in which the predicted surrounding traffic appears or is at least expected, the masking can preferably be adapted to the path of the roadway section ahead. It is thus possible to achieve reliable covering of the respectively relevant zone of the light source which results in the best compromise between freedom from dazzling and illumination.

The inventive method now presented enables a considerable reduction in the reaction time when controlling the high beam function of a vehicle. In particular, the predictive properties of the method which can be realized hereby enable virtually full preparation for the appearance of surrounding traffic which is not yet currently in the field of vision so that, upon its actual appearance, the previously specified appropriate reaction in terms of the high beam function can take place, as it were, in real time.

The invention furthermore relates to a high beam assist system for carrying out the previously explained method according to the invention. At this point, to avoid repetition, reference is made to the detailed embodiments associated with the method according to the invention in this regard.

Figure 1:
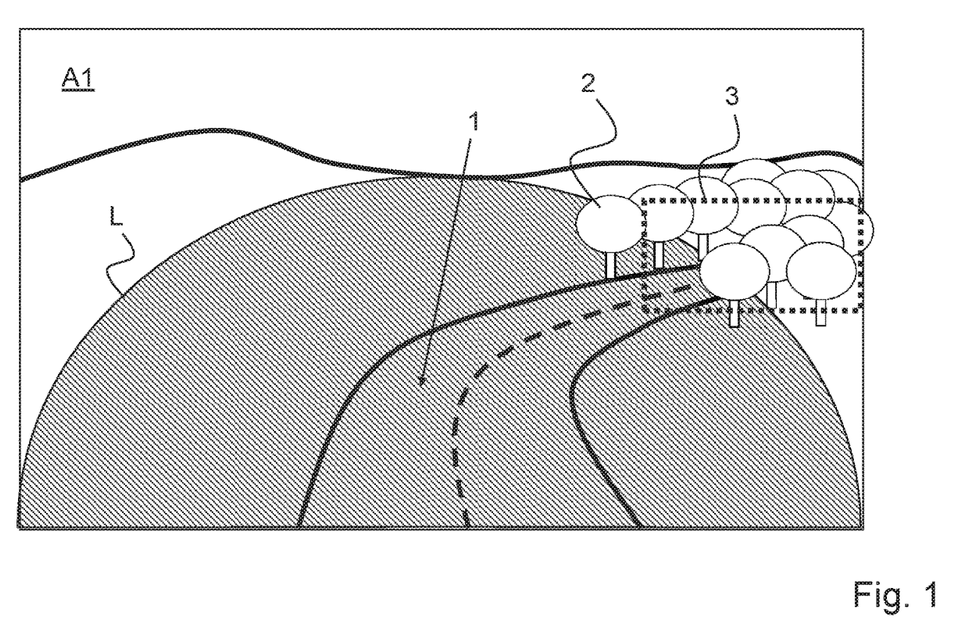
FIG. 1 a first surroundings segment with a zone on a roadway section ahead which is identified as critical, FIG. 2 the surroundings segment of FIG. 1 with an indicator for potential surrounding traffic within the critical zone, FIG. 3 the surroundings segment of FIGS. 1 and 2 with a reaction according to the method, FIG. 4 a second surroundings segment with a zone on a roadway section ahead which is identified as critical, FIG. 5 the surroundings segment of FIG. 4 with an indicator for potential surrounding traffic within the critical zone, FIG. 6 the surroundings segment of FIGS. 4 and 5 with a reaction according to the method, FIG. 7 a third surroundings segment with a zone on a roadway ahead which is identified as critical, FIG. 8 the surroundings segment of FIG. 7 with an indicator for potential surrounding traffic within the critical zone, FIG. 9 the surroundings segment of FIGS. 7 and 8 with a reaction according to the method.

An exemplary embodiment of the invention is explained in more detail with the aid of the description below. A drawing shows:

FIG. 1 shows a first surroundings segment A1, from which a roadway section 1 ahead can be recognized. This and the subsequent FIGS. 2 to 9 represent typical situations which are revealed when looking through a windscreen (not shown in more detail) of a vehicle which is stationary, or preferably moving, with activated high beam.

Furthermore, a zone L which is shaded in all FIGS. 1 to 9, indicates a high beam cone of a headlight (likewise not shown in more detail) of the vehicle.

In the present case, the roadway section 1 has a right bend ahead, which leads into a section which has trees 2 alongside it. In this respect, the part of the roadway section 1 which is covered by the trees 2 is not visible and is therefore outside the field of vision. It can be seen that the section which has the trees 2 is only partially detected by the high beam cone L.

According to the invention, the roadway section 1 ahead is firstly analyzed by means of a sensor (not shown here) and/or GPS in combination with stored cartographic material, wherein the part of the roadway section 1 which is covered by the trees 2 is identified as a critical zone 3. The identification as a critical zone 3 is associated with a marking thereof, which brings about a corresponding sensitization of an optical sensor (likewise not shown here) of the high beam assist system according to the invention for this critical zone 3.

Figure 2:
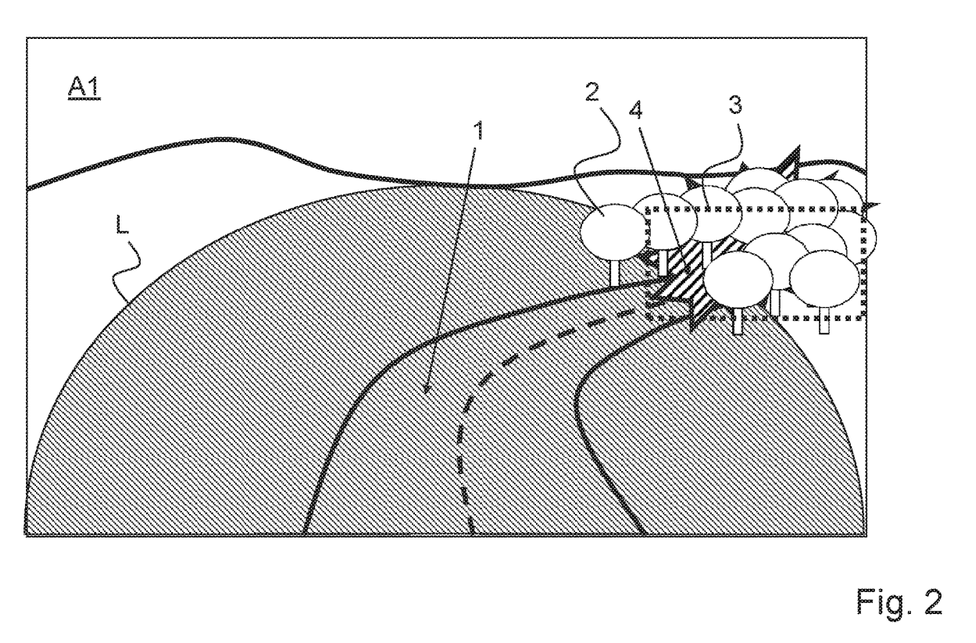

FIG. 2 reveals a schematic increase in the surrounding brightness 4 within the zone 3 of the first surroundings segment A1 which has been previously identified as critical, which is evaluated as an indicator for potential surrounding traffic within the critical zone 3. In other words, the high beam assist system now assumes on the basis of the increased surrounding brightness 4 that this could be caused by surrounding traffic or a vehicle.

Figure 3:
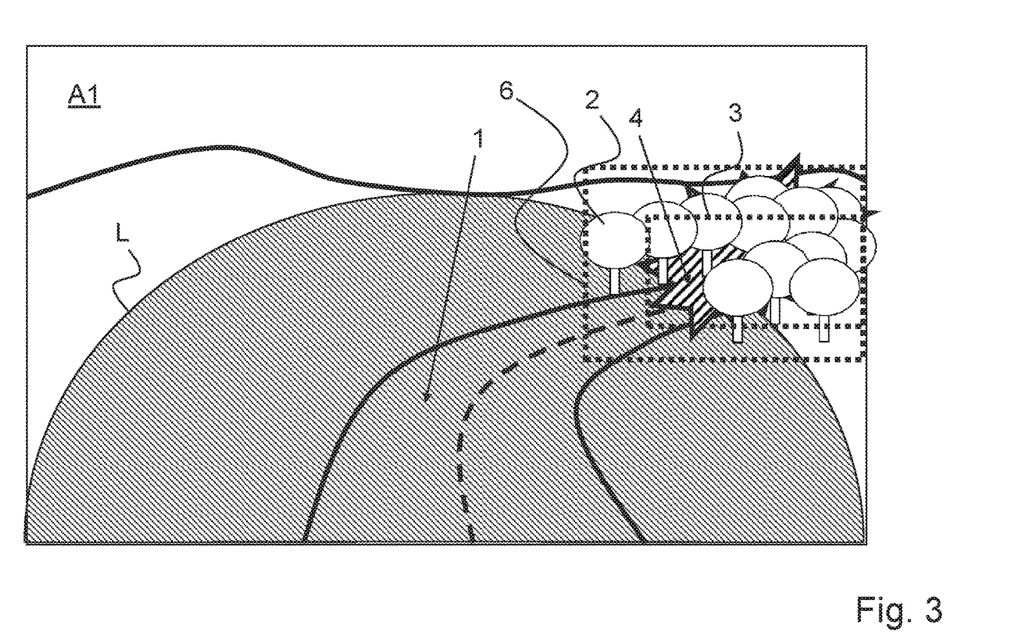

FIG. 3 now indicates the possible reactions to the increased surrounding brightness 4 as an indicator for possibly approaching traffic which is not yet in the field of vision. Therefore, the sensitivity of the sensor of the high beam assist system according to the invention can be enhanced with regard to the critical zone 3, which means, for example, the activation of an extremely sensitive mode. As soon as surrounding traffic is now actually detected within the critical zone 3, for example due to a direct light source thereof, the the high beam function can be controlled directly without a plausibility check. Depending on the configuration of the headlight, diverse control options are now conceivable, which range from a total deactivation of the active high beam to an at least zonal change in its intensity to masking a high beam cone so as to not dazzle the detected surrounding traffic.

Figure 4:
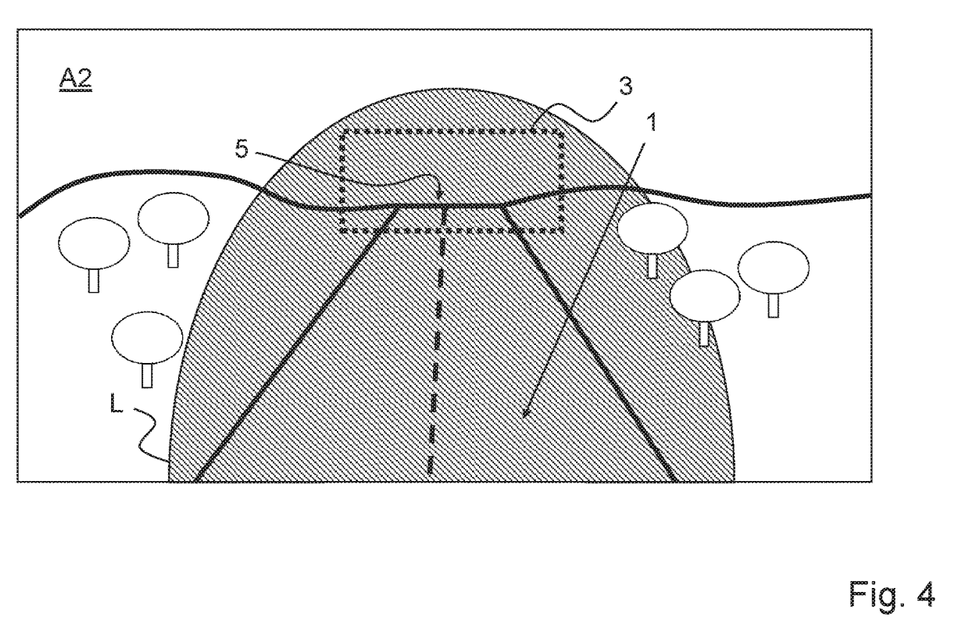

FIG. 4 shows a second surroundings segment A2, which shows a linear path of the roadway section 1 ahead. It can be seen that the roadway section 1 leads up to a brow of a hill 5, so that surrounding traffic which is potentially behind the brow of the hill 5 is outside the field of vision. The roadway section 1 ahead is also firstly analyzed here by means of the sensor and/or GPS in combination with stored cartographic material, wherein, in the present case, the brow of the hill 5 located in the high beam cone L is identified as a critical zone 4. The identification as a critical zone 3 is also associated here with a corresponding marking thereof.

Figure 5:
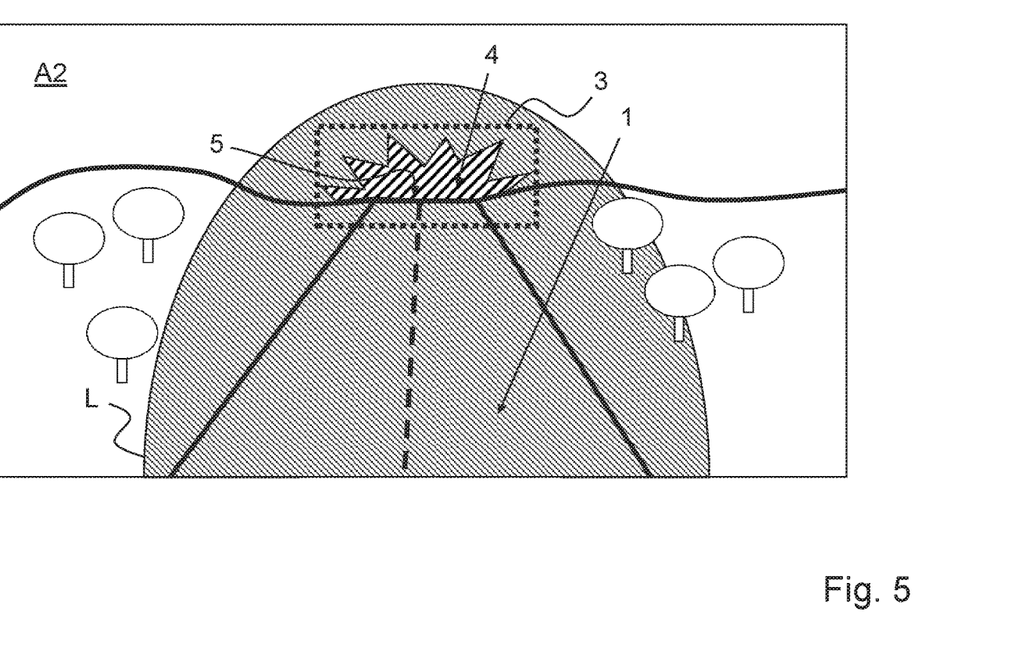

FIG. 5 reveals a schematic increase in the surrounding brightness 4 within the zone 3 of the second surroundings segment A2 which has been previously identified as critical, which is evaluated as an indicator for potential surrounding traffic in the form of oncoming traffic within the critical zone 3. In other words, the high beam assist system now again assumes on the basis of the increased surrounding brightness 4 that this could be caused by surrounding traffic or an oncoming vehicle.

Figure 6:
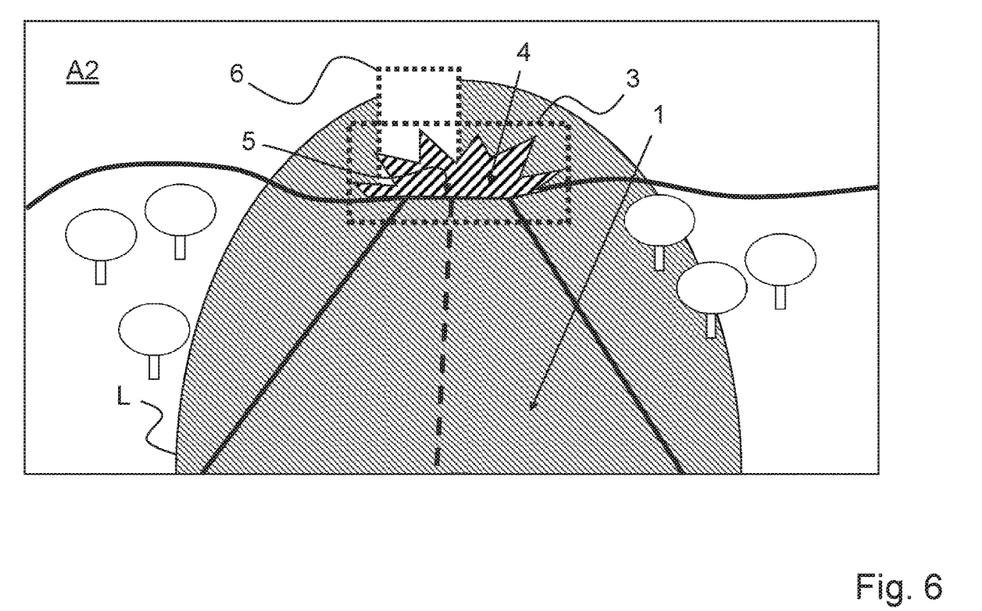

FIG. 6 reveals the possible reactions to the increased surrounding brightness 4 as an indicator for possibly approaching surrounding traffic not yet in the field of vision. As above, the sensitivity of the sensor of the high beam assist system according to the invention can also be enhanced with regard to the critical zone 3. As soon as surrounding traffic is now actually detected within the critical zone 3, for example by a direct light source thereof, the high beam function can be controlled directly without a plausibility check. Depending on the configuration of the headlight, diverse control options are also conceivable here, which range from a total deactivation of the active high beam to a change in its intensity to masking a high beam cone so as to not dazzle the detected surrounding traffic. It can be seen that, in the present case, the high beam assist system is acting on the assumption that traffic travels on the right, whereupon the high beam cone L illuminating the left part of the roadway section 1 ahead in the zones of the brow of the hill 5 is masked 6 accordingly or at least the intensity of the high beam cone L is reduced in this zone.

Figure 7:
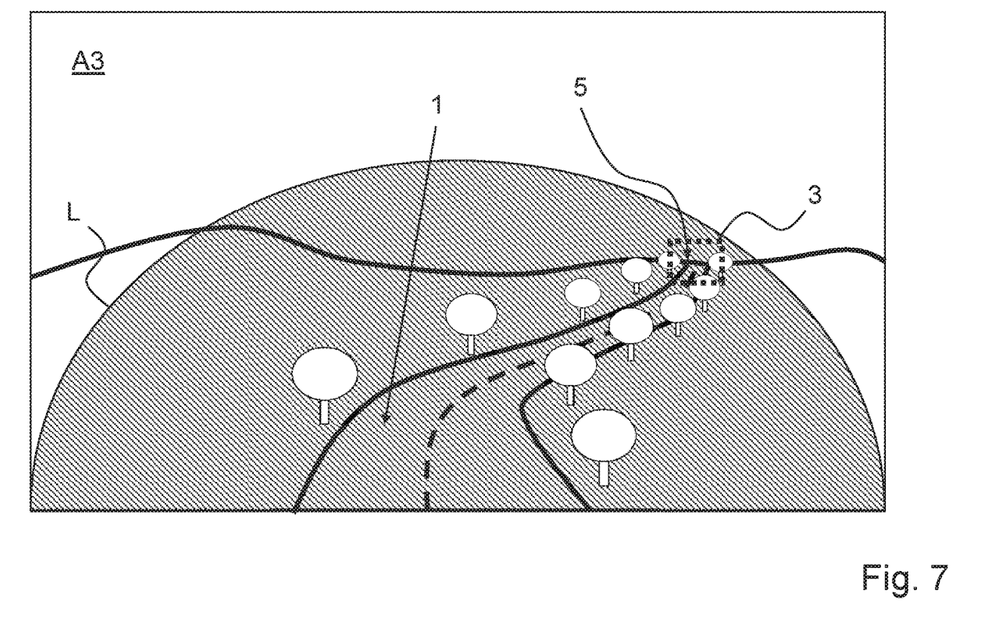

FIG. 7 shows a third surroundings segment A3, in which the roadway section ahead describes a right bend tapering to a brow of a hill 5. As above, surrounding traffic which is potentially behind the brow of the hill 5 is also outside the field of vision in this situation. The roadway section 1 ahead is again now firstly analyzed by means of the sensor and/or GPS in combination with stored cartographic material, wherein, in the present case, the brow of the hill 5 located in the high beam cone L is identified as a critical zone 4 and marked accordingly.

Figure 8:
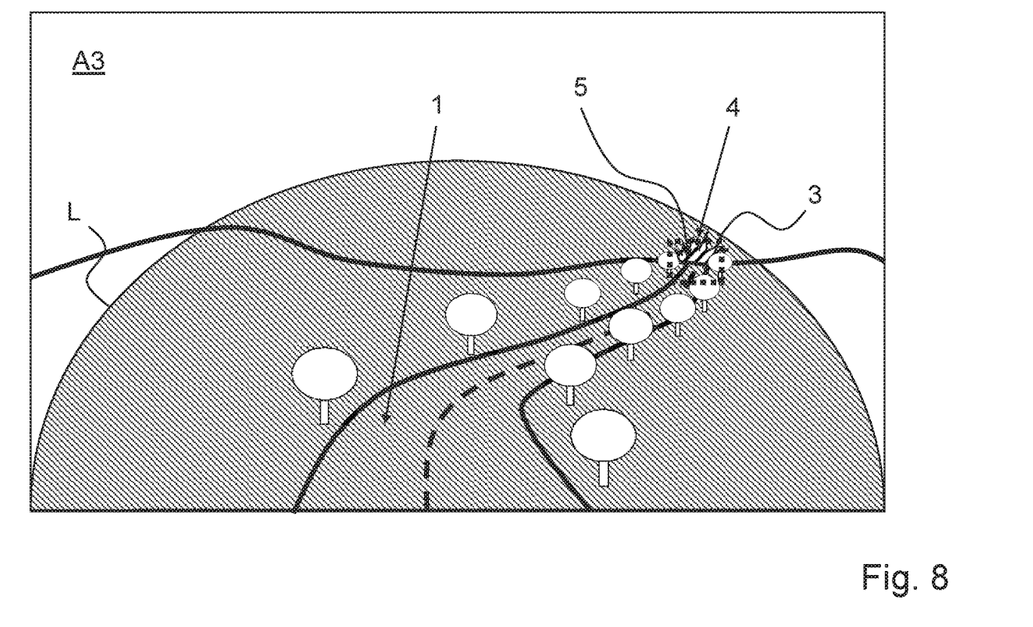
Figure 9:
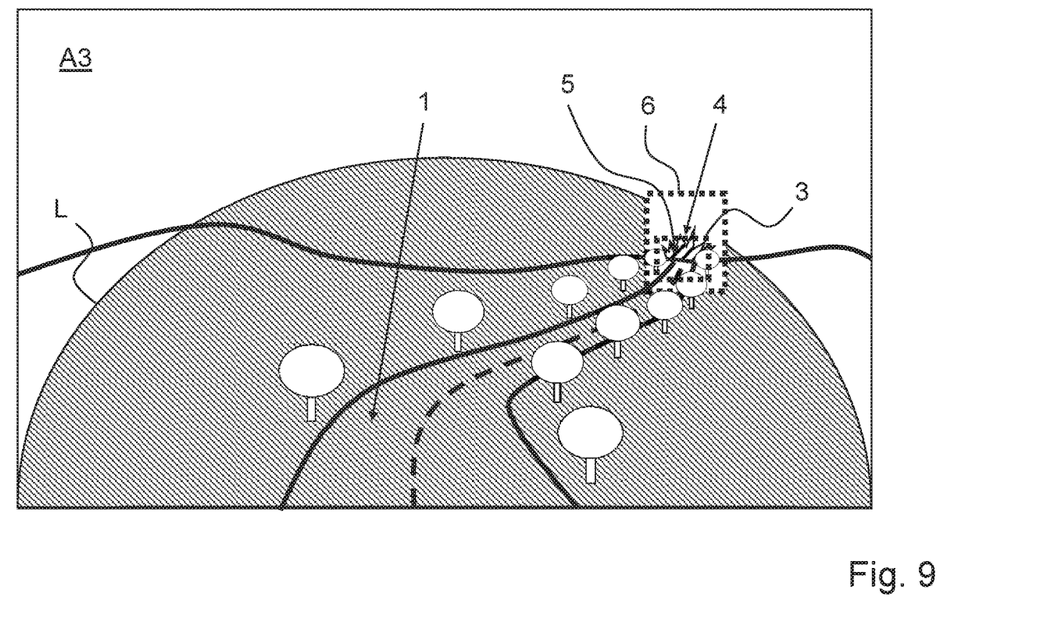

FIG. 8 shows, in a schematic manner, the increase in the surrounding brightness 4 within the zone 3 of the third surroundings segment A3 which has been previously identified as critical, which is also evaluated here as an indicator for potential surrounding traffic in the form of oncoming traffic within the critical zone 3. Therefore, the high beam assist system again assumes on the basis of the increased surrounding brightness 4 that this could be caused by surrounding traffic or an oncoming vehicle.

FIG. 9 again shows the possible reactions to the increased surrounding brightness 4 as an indicator for possibly approaching surrounding traffic not yet in the field of vision. The sensitivity of the sensor of the high beam assist system according to the invention can also be enhanced with regard to the critical zone 3 here. If surrounding traffic is actually detected within the critical zone 3, for example by a direct light source thereof, the high beam function can also be controlled directly here without a plausibility check, wherein the control furthermore depends on the configuration of the headlight. The control can therefore range from a total deactivation of the active high beam to a change in its intensity to masking a high beam cone L so as to not dazzle the detected surrounding traffic. It can be seen that, in the present case, part of the roadway section 1 ahead which is illuminated by the high beam cone L is masked by means of a masking device 6 or the intensity of the high beam cone L is at least reduced in this zone.

LIST OF REFERENCE SIGNS

1 Roadway section
2 Tree
3 Critical zone
4 Surrounding brightness
5 Brow of a hill
6 Masking
A1 First surroundings segment
A2 Second surroundings segment
A3 Third surroundings segment
L High beam cone

The invention claimed is:

1. A method for operating a headlight of a vehicle, in which an activated high beam function is controlled based on surroundings information, the method comprising:
   identifying, based on a likelihood that an appearance of surrounding traffic is not yet in a field of vision, at least one critical zone (3) of a roadway section (1),
   monitoring the at least one critical zone (3) for at least one indicator that surrounding traffic is likely coming into the field of vision, and
   controlling, based on the at least one indicator, the high beam function.

2. The method according to claim 1, wherein the roadway section (1) ahead of the vehicle is analyzed by a sensor and/or GPS in combination with stored cartographic material.

3. The method according to claim 1, wherein the at least one critical zone comprises a brow of a hill, an intersection, a bend, and/or a traffic circle.

4. The method according to claim 1, wherein the at least one indicator comprises an increase in surrounding brightness (4) and/or a rise in the number of reflections.

5. The method according to claim 4, wherein upon an appearance of the at least one indicator (4) within the at least one critical zone (3), the high beam function is controlled by:
   enhancing a sensitivity of an optical sensor in the at least one critical zone;
   deactivating the high beam function;
   altering an intensity of the high beam function; and/or
   masking (6) a high beam cone (L) in a zone in which surrounding traffic is expected.

6. The method according to claim 5, wherein the sensitivity of the optical sensor in the at least one critical zone (3) is enhanced when a defined limit value for the increase in the surrounding brightness (4) is exceeded.

7. The method according to claim 5, wherein the masking (6) of the high beam cone (L) is adapted to a path of the roadway section (1).

8. The method according to claim 1, wherein upon detection of a direct light source within the at least one critical zone (3), the high beam function is controlled without carrying out a plausibility check.

9. The method according to claim 8, wherein upon detection of surrounding traffic within the at least one critical zone (3), the high beam function is controlled by:
   deactivating the high beam function;
   altering an intensity of the high beam function; and/or
   masking (6) a high beam cone (L) in a zone in which a predicted surrounding traffic appears.

10. The method according to claim 9, wherein the masking (6) of the high beam cone (L) is adapted to a path of the roadway section (1).

11. A high beam assist system configured to implement the method according to claim 1.

* * * * *